United States Patent [19]

Mohan et al.

[11] Patent Number: 4,874,072

[45] Date of Patent: Oct. 17, 1989

[54] VISCOUS FAN DRIVE CONTROL WITH INTEGRATED SPEED SENSOR

[75] Inventors: Robert J. Mohan, Madison Heights; Walter K. O'Neil, Birmingham, both of Mich.

[73] Assignee: Eaton Corporation, Cleveland, Ohio

[21] Appl. No.: 119,133

[22] Filed: Nov. 10, 1987

[51] Int. Cl.$^4$ .............................................. F16D 35/00
[52] U.S. Cl. ................................ 192/58 B; 192/82 T; 192/103 F
[58] Field of Search ............... 192/58 B, 82 T, 103 F, 192/103 R

[56] References Cited

U.S. PATENT DOCUMENTS

| | | | |
|---|---|---|---|
| 27,598 | 10/1880 | Bauer. | |
| 37,104 | 10/1881 | Winckler. | |
| 1,410,361 | 3/1922 | Blackmore. | |
| 1,433,399 | 10/1922 | Modine. | |
| 2,791,100 | 5/1957 | Maurer | 62/4 |
| 2,974,768 | 3/1961 | Hause | 192/82 T |
| 3,055,473 | 9/1962 | Oldberg et al. | 192/58 B |
| 3,207,279 | 9/1965 | Ahlen | 192/57 |
| 3,684,397 | 8/1972 | Elmer | 416/39 |
| 3,809,197 | 5/1974 | Clancey | 192/58 B |
| 3,880,265 | 4/1975 | Elmer | 192/58 B |
| 4,056,178 | 11/1977 | Detty | 192/58 B |
| 4,246,995 | 1/1981 | Gee | 192/58 B |
| 4,271,945 | 6/1981 | Budinski | 192/58 B |
| 4,310,084 | 1/1982 | Nonnenmann | 192/58 B |
| 4,310,085 | 1/1982 | LaFlame | 192/58 B |
| 4,312,433 | 1/1982 | Bopp | 192/58 B |
| 4,346,797 | 8/1982 | Bopp | 192/58 B |
| 4,362,226 | 12/1982 | Gee | 192/58 B |
| 4,403,757 | 9/1983 | Shepherd | 192/58 B |
| 4,458,798 | 7/1984 | Bopp | 192/58 B |
| 4,502,580 | 3/1985 | Clancey | 192/58 B |
| 4,579,206 | 4/1986 | Velderman et al. | 192/58 B |
| 4,591,037 | 5/1986 | Bopp | 192/58 B |
| 4,650,045 | 3/1987 | Weible | 192/0.02 R |

*Primary Examiner*—Rodney H. Bonck
*Attorney, Agent, or Firm*—J. G. Lewis

[57] ABSTRACT

A viscous fan clutch (10) is typically employed in a fan drive mechanism within a truck or automobile. A shaft (18), driven by the engine (12), rotates a clutch member (42) within the fan drive. The clutch member is arranged for fluid engagement with a body member (60) for the transmission of torque thereto when fluid is disposed in an operating chamber (106) defined by complimentary shear surfaces in the clutch and body members (48 and 98), respectively. A tether assembly (30) operates as an actuator to displace a valving element (196) within the clutch to control the torque transmission there through and thus the speed of the output shaft and fan (34) thereof. Fan speed is regulated by variable current signal applied to a coil (174) within assembly (30) to selectively variably frictionally engage valve element assembly (196) with a grounded thrust surface or reaction member (190) to effect limited displacement of a valve element (198) in response thereto. A fan speed feedback signal is generated by teeth (164) passing in close proximity to a magnetic pick-up (166) is integrated within tether housing (122) and output to control circuit (222) via a conducting path (173 or 183).

18 Claims, 8 Drawing Sheets

| FIG 9a | FIG 9b |
|---|---|

VISCOUS FAN DRIVE CONTROL WITH INTEGRATED SPEED SENSOR

INTRODUCTION

The present invention relates to viscous fluid couplings, and more particularly to such couplings which are continuously variable as a function of certain parametric variations in their host systems. More particularly still, the present invention relates to viscous fluid couplings employed as vehicle fan drives which are controlled as a function of coolant temperature.

CROSS REFERENCE

The subject matter of this invention is related that of U.S. Pat. Nos. 4,346,797, 4,458,798 and 4,591,037 as well as U.S. application No. 119,132 filed on even date herewith, entitled "Friction Brake for Variable Speed Viscous Fan Control" by R. Mohan.

BACKGROUND OF THE INVENTION

Viscous fluid couplings have received wide acceptance in the automobile industry for controlling the amount of torque transmitted to a radiator cooling fan. The most common form of such viscous fluid couplings is the air temperature response type such as illustrated in U.S. Pat. No. 3,055,473. In certain applications, however, it has become desirable to directly sense the temperature of the liquid coolant entering the radiator rather than the temperature of the air passing through the radiator. To date, many arrangements have been proposed to accomplish this result. Typically, these arrangements have made use of wet or dry plate clutches that are pneumatically actuated or electromagnetic clutches that are electrically actuated. A major shortcoming of many prior art magnetically actuated clutches or couplings resides in the fact that relatively high torque levels are involved. These high torque levels require relatively massive engagement mechanisms which must be engaged through the action of intense magnetic fields set up by large and expensive inductors. Such inductors draw substantial amounts of energy from the associated vehicle's electrical system and thus reduce overall operating efficiency. Additionally, such devices typically employ relatively large springs which bias a portion of the engagement mechanism toward either the engaging or nonengaging position. Accordingly, the magnetic field must also overcome the force of the biasing spring as well as the mass of the engagement mechanism.

More recently, improved prior art electromechanically actuated viscous fluid couplings have been suggested which employ inductors to establish magnetic fields which activate valves controlling the flow of viscous fluid within the clutch. This arrangement represents an improvement in asmuch as the magnetic field established by the inductor only had to be large enough to move a relatively small valving arm and biasing spring. Although representing an improvement, such devices had inherent inefficiencies in asmuch as their valving arm biasing springs had to be large enough to overcome the kinetic energy of the viscous fluid flowing thereby.

Most recently, advanced prior art electromechanically actuated viscous fluid couplings have proposed providing valving elements which are mounted for rotation with one of the viscous clutch members which operate to frictionally engage the other member to extract kinetic energy therefrom to move the valving element and thereby vary the torque transmitted between the clutch members. This arrangement is desirable in a simple "ON" and "OFF" type clutch. However, because the amount of kinetic energy to be extracted is related to the differential speed of the clutch plates, it is apparent that a speed differential is not present during all operating modes of the fan and thus an unacceptable time lag may occur between the time a control signal input is received and the clutch responds. This problem is particularly acute in the case of continuously variable fan drives where an adequate energy source for movement of the valving member must be available at all times during operation.

Although adjustable speed fan drives are known, they tend to cycle and produce objectionable noise as well as waiver or hunt in speed about a desired operating point. To ensure adequate cooling, they generally are operated at an excess speed to the optimum thereby consuming excessive energy and reducing overall efficiency.

A further disadvantage of known prior art continuously variable fan drives lies in the continuous sensing of drive operating conditions and the implementation of those sensed conditions within the overall system operating strategy. Methodology for sensing ambient air or host engine coolant temperature is well treated in the literature. However, the monitoring of output or fan speed within the relatively hostile environment of an automobile engine presents unique problems which have not yet been satisfactorily resolved. Specifically, the most common approach to sensing fan speed is through the placement of a flag or other suitable member on a fan blade or external to the output member of the fan clutch and mounting an inductive member in the plane of rotation of the flag. Although such an arrangement can be made to function in the intended manner, practice has found that extremely robust and expensive sensors must be employed. Even so, such sensors are prone to degradation in performance through vibration, heat cycling, contamination and misalignment with respect to the rotating flag member.

It will be apparent from a reading of the specification that the present invention may be advantageously utilized with fluid couplings intended for many different applications. However, the invention is especially useful when applied to a viscous fluid coupling which serves as a drive for the radiator cooling fan of a vehicle engine, and will be described in connection therewith.

BRIEF DESCRIPTION OF THE INVENTION

The present invention is embodied in a viscous fluid clutch of the type including first and second clutch members mounted for relative rotation about a common axis and defining cooperating shear surfaces which operate to transmit torque when a flow of viscous fluid is established therebetween. According to the invention, and by way of overcoming the above described shortcomings of prior art viscous fluid clutches, the viscous fluid clutch is provided with a valving element which is mounted for rotation with one of the members and is selectively displaceable by actuator means to modulate the flow of fluid between the cooperating shear surfaces in response to an actuation signal. Speed sensing means are provided to monitor the absolute rotational speed of one of the members and to generate a speed signal as a function thereof. The speed sensing means comprises flag and sensor elements disposed in relative rotational alignment, with one of the elements carried by the actuator and the other by one of the rotating members. Finally, control means are provided operative to generate the actuation signal as a function of the speed signal. This arrangement permits continuously variable control of the clutch in all operating modes including speed feedback from a member integrated within the actuator means.

According to an aspect of the invention, the valving element is operable to frictionally engage a substantially grounded thrust surface to modulate the flow of fluid between the cooperating shear surfaces. This arrangement permits continuously variable control of the clutch in all operating modes with the exercise of a relatively small amount of externally applied energy by tapping the kinetic energy of one of the rotating members.

The preferred embodiment of the invention finds particular application in a motor vehicle viscous fluid clutch of the type which includes a first member fixed on a shaft for rotation therewith, and a second clutch member supported by the shaft for rotation thereabout and having shear surfaces which coact with complementary shear surfaces on the first member to define an operating chamber therebetween. A fluid storage chamber is located near the operating chamber and a pump provides a circulating flow of viscous fluid between the chambers. According to the preferred embodiment of the invention, a valving assembly is mounted coaxially with the second member for rotation therewith and is axially displaceable to frictionally engage a thrust surface defined by a tethered housing carried by said second member to effect modulation of the flow of fluid through a port interconnecting the chambers by angular displacement of the valving element from a first limit of travel in which the element overlays the port to a second limit of travel in which the port is relatively unobstructed. Fan speed feedback is provided by flag means carried by the second member in rotational alignment with a speed sensor carried by the tethered actuator housing. This arrangement has the advantage of permitting fan speed sensing in a protected environment.

According to another aspect of the invention, actuator means such as an electromagnet is provided which operates to displace the valving assembly from a first nonengaging position to a second position to effect the frictional engagement. This arrangement provides the advantage of an external noncontacting actuating mechanism which avoids the use of slip rings or other interfacing apparatus which is susceptible to contamination and premature deterioration.

According to another aspect of the invention the control means functions to operate the clutch at a set point which is updated as a function of sensed coolant temperature and speed feedback information. This arrangement has the advantage of conserving energy and minimizing annoying noise associated with excessive fan speed by continuously operating at an optimum speed required to provide adequate cooling to the host engine.

According to another aspect of the invention, biasing means such as a spring is provided to urge the valving element axially into its first position. This arrangement provides the advantage of the utilization of a relatively small spring and commensurate electromagnet inductor current.

According to another aspect of the invention, the actuator means comprises a tethered electromagnet operative to establish a magnetic circuit passing through ferrous material within the housing and valving means. Furthermore, the sensor element comprises a variable reluctant sensor for detecting the presence or absence of the flag element within the sensing region within the flux path of the magnetic circuit. The clutch inductor coil is operative to establish a magnetic field having a characteristic flux intensity generally additive to that of the variable reluctance sensor within the sensing region. This arrangement has the advantage of permitting use of a relatively low output reluctance speed sensor and avoiding the risk of magnetic saturation of the sensor.

According to another aspect of the invention, a conducting path is provided interconnecting the control means and actuator means. The speed sensing means is further operative to superimpose the speed signal upon the actuation signal for transmission to the control means via the conducting path. This arrangement has the advantage of permitting simultaneous viscous fluid clutch variable actuation and speed signal feedback through a single conductive path.

According to still another aspect of the invention, the speed sensing means is operative to sense differential current across the inductor and generate the speed signal as a function thereof. This arrangement has the advantage of simply detecting the speed feedback signal information from the induction coil current control path.

Various other features and advantages of this invention will become apparent upon reading the following specification, which, along with the patent drawings, describes and discloses preferred and alternative embodiments of the invention in detail.

The detailed description of the disclosed embodiments makes reference to the accompanying drawings.

DETAILED DESCRIPTION OF THE SPECIFIC EMBODIMENTS

Figures 1, 5:
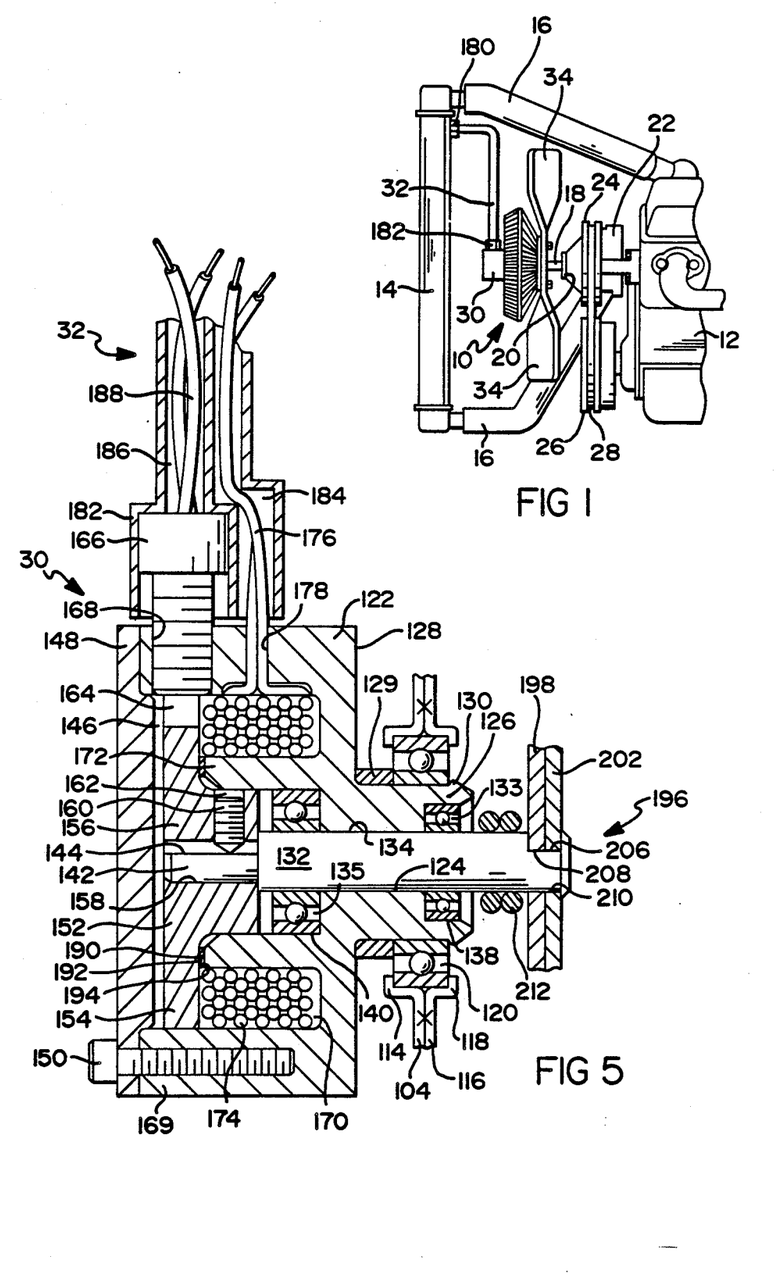
FIG. 1, is a side plan broken view of the preferred embodiment of the invention in its intended environment.
FIG. 5, is a sectional view of the electromagnetic clutch assembly taken on lines 5—5 of FIG. 4.

Referring to FIG. 1, the preferred embodiment of a viscous fluid clutch 10 is illustrated in its intended environment with a truck or automobile internal combustion engine 12 and radiator 14. Engine 12 and radiator 14 are interconnected by hoses 16 in the usual manner to provide for the flow of fluid coolant from engine 12 through radiator 14 for return to engine 12. Clutch 10 comprises a driving or input shaft 18 including an integral shaft flange 20 which is mounted to an engine coolant pump 22 for rotation therewith. Input shaft 18 and pump 22 are driven through pulleys 24 and 26 by a V-belt 28 as is well known in the art. A tether assembly 30 is carried for relative rotation on the front (left-hand as view in FIG. 1) face of clutch 10 and is grounded to radiator 14 by a rigid conduit 32 as will be described in greater detail hereinbelow. Definitionally, for purposes of the present specification, grounding is defined as held immobile with respect to the host apparatus defining the environment surrounding clutch 10. In the case of an automobile, the grounding point is the car body. In the broadest sense, a substantially grounded element can itself be moving with respect to other referenced members but at a substantially lesser relative rate. A plurality of fan blades 34 are secured to clutch 10 for rotation therewith.

Referring to FIGS. 2 through 6, the internal structure of clutch 10 is shown in detail. Flange 20 defines a number of circumferentially spaced apertures 35 which accommodate bolts (not shown) for mounting clutch 10 to pump 22. Driving shaft 18 is provided with a reduced intermediate portion 36 which functions as an inner race supporting means for a ball bearing assembly 38. A shoulder 40 formed on shaft 18 restrains bearing 38 in one axial direction.

Figure 3:
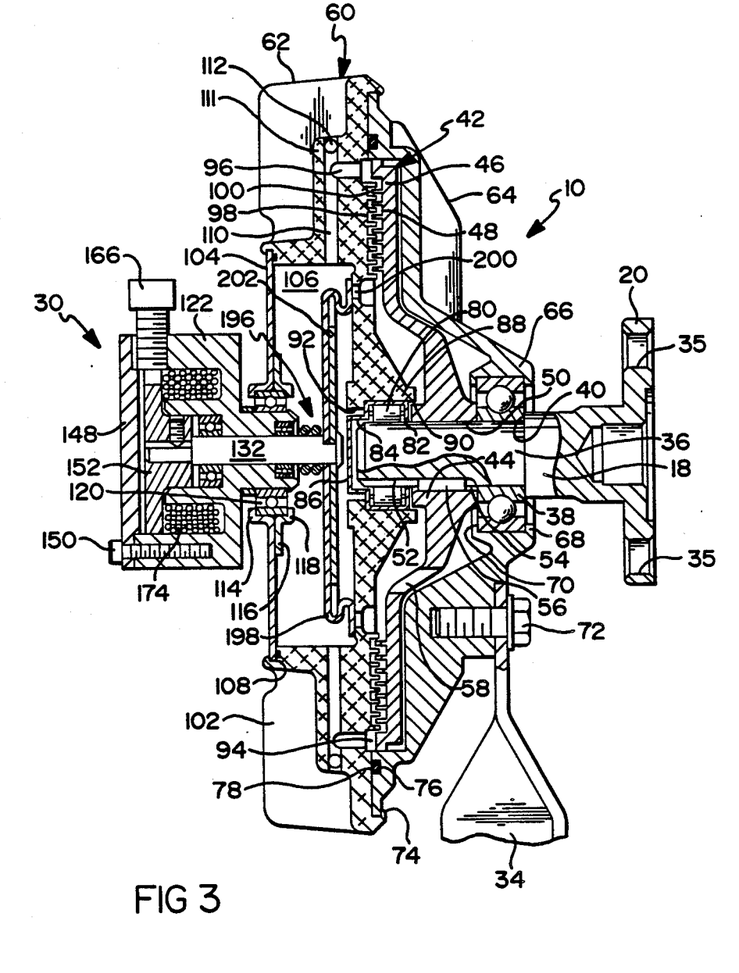
FIG. 3, is a sectional view taken on lines 3—3 of FIG. 2 on an expanded scale.

A clutch member 42 is provided with a hub portion 44 and a plate portion 46 having a plurality of concentric annular coupling lands 48 formed on the back side thereof. Hub portion 44 is provided with a straight wall opening 50 which has an interference fit with shaft portion 18 so that clutch member 42 rotates with and is axially mounted on shaft 18. Shaft portion 36 and hub 44 each have axially extending slots 52 and 54, respectively, formed therein receiving a key 56 which prevents relative rotation between shaft 18 and clutch member 42. Hub portion 44 is pressed onto shaft portion 36 until it abuts the inner race of bearing 38 to restrain bearing 38 in the other direction of axial movement. Several breathing apertures 58 are formed in clutch member 42 at the point of transition between hub portion 44 and plate portion 46.

A cover assembly 60 comprising a cover member 62 and a body member 64 is mounted for rotation on shaft 18. Body 64 includes a hub 66 which is supported on the lateral surface of the outer race of bearing assembly 38 and is disposed in an interference fit therewith. A shoulder portion 68 of hub 66 reacts against an end surface of the outer race of bearing assembly 38 and limits movement of body 64 in one axial direction. A second shoulder portion 70 also formed in hub 66 of deformed material limits movement of body 64 in the other axial direction. Body 64 and cover 62 are thereby free to rotate about shaft 18 upon bearing assembly 38. Fan blades 34 are secured at the shank portion thereof by bolts 72 at a radially intermediate portion of body 64. Cover 62 is affixed with body 64 by means of a shoulder portion 74 which circumferentially embraces the radially outwardmost edge of body 64. An elastomeric seal 76 resides in an annular channel 78 in the radially outwardmost portion of body 64 which abuts cover 62.

Reduced intermediate portion 36 of shaft 18 extends leftwardly (as view in FIG. 3) beyond hub 44 of clutch member 42 and receives thereon a roller bearing assembly 80. Bearing assembly 80 includes an outer race 82 which is generally cup-shaped and includes a side wall portion 84 with a radially inwardly opening recess formed therein for receiving the bearing assembly's rollers, and a bottom portion 86 for enclosing and sealing the end of shaft 18.

Cover 62 has a hub portion 88 and stepped through bore 90 formed therein. Outer race 82 is press-fit within bore 90 and is restrained from axial displacement in one direction by a step 92 formed in bore 90 and in the other axial direction by hub 44 of clutch member 42.

Cover 62 is provided with an annular recess 94 formed in the face thereof on the side adjacent lands 48. A pair of diametrically opposed axially directed holes 96 are disposed slightly radially outwardly of a second set of annular lands 98, which are defined by cover 62. Annular lands 48 and 98 and the adjoining raised portion of body 64 and cover 62 constitute shear surfaces and define an operating chamber 100 therebetween which operates such as described in U.S. Pat. No. 4,056,178, the specification of which is incorporated herein by reference. Annular lands 48 terminate or alternatively are cut away in the form of a V-notch to form three equally spaced radially directed channels the structure defines a known fluid path commencing with the area adjacent lands 48 and 98, the radial channels, axially directly holes 98 and annular recess 94.

Cooling fins 102 are integrally formed in cover 62 adjacent fan blades 34. Cooling fins 102 are arranged to provide additional cooling area to dissipate heat which is generated in clutch 10.

A reservoir cover plate 104 cooperates with cover 62 to define an annular fluid storage chamber 106. Cover plate 104 is received in an annular notched recess 108 provided in cover 62 to laterally confine cover plate 104. The material of cover plate 62 is deformed to retain and seal plate 104 in notched recess 108.

Two diametrically opposed radially directed return passage apertures 110 are defined by a thickened portion 111 of cover 62 and interconnect holes 96 with fluid storage chamber 106. The radially outwardmost end of return passage apertures 110 are sealed with an interference fit ball 112 or other suitable material.

Reservoir cover plate 104 is generally annular in shape and has an outwardly (leftwardly as view in FIG. 3) extending step portion 114 at the radially inwardmost extent thereof. A generally annular retainer ring 116, having an inwardly (rightwardly) extending step portion 118 complementary to step portion 114 of cover plate 104 is affixed thereto such as by welding or other suitable means. Step portions 114 and 118 coact to define a radially inwardly opening recess within which is received the outer race of a ball bearing assembly 120.

Figure 4:
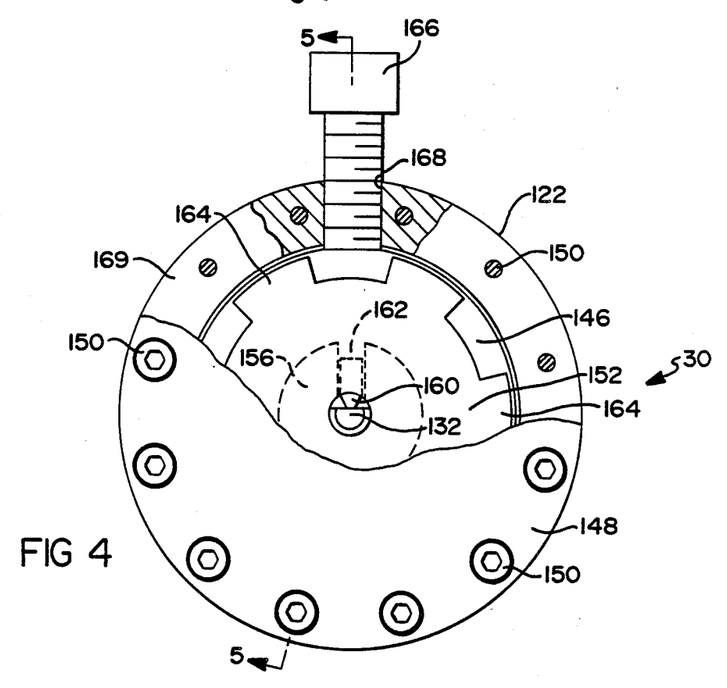
FIG. 4, is a front plan view of the brake assembly of the clutch of FIG. 3 on an expanded scale with a portion of its cover plate and housing broken away to expose internal details.

Referring to FIGS. 4 and 5, tether assembly 30 includes a generally cylindrical housing 122 with a stepped axial bore 124 therethrough. The inwardmost part of housing 122 has a portion of reduced diameter 126, the outer surface of which is press-fit within the inner race of bearing assembly 120. Reduced diameter portion 126 of housing 122 has a step 128 formed therein abutting one lateral edge of the inner race of bearing assembly 120 through an intermediate annular spacer ring 129, thereby restraining tether assembly 30 in one axial direction. The outer surface material of the innermost end of reduced diameter portion 126 of housing 122 is deformed radially outwardly at 130 to embrace the other lateral surface of the inner race of bearing assembly 120 and thereby restrain tether assembly 30 in the other axial direction. Thus, tether assembly 30 is carried by cover assembly 60 but has complete rotational freedom with respect thereto.

An armature shaft 132 is slidingly received within and extends through bore 124. Shaft 132 has a central portion 134 dimensioned closely with bore 124 to effect a sliding seal relationship therebetween. Shaft 132 is supported for rotation with respect to housing 122 by two roller bearings 133 and 135 which have the inner races thereof slip-fit over central portion 134 of shaft 132 and the outer races thereof press-fit within axially spaced areas of increased diameter 138 and 140 defined by bore 124. Referring to FIG. 5, a portion of shaft 132 of reduced diameter 142 extending leftwardly from bearing 135 has a flat 144 formed therein. Bore 124 opens into a cavity 146 within the left-hand end of housing 122 which is closed by a cover 148. Cover 148 is held in assembly with housing 122 by a plurality of circumferentially spaced screws 150 or other suitable hardware.

An armature 152 comprising a plate portion 154 and hub portion 156 is received within cavity 146. Hub portion 156 has an axial through bore 158 formed therein receiving reduced diameter portion 142 of shaft 132 therein. A set screw 160 is threadably engaged within a bore 162 extending radially through hub portion 156 to engage flat 144 and thereby affix armature 152 to shaft 132.

As can be best seen in FIG. 4, armature 152 has a plurality of circumferentially spaced teeth 164 formed about the perimeter thereof. Teeth 164 of armature 152 rotate in close proximity to the sensing end of a magnetic pickup 166 such as that manufactured by Airpax model 085-101-0024 which is threadably received within a radial bore 168 extending through a cylindrical side wall 169 of housing 122, the purpose and function of which will be described in detail hereinbelow.

In FIG. 5, an annular recess 170 extends rightwardly from cavity 146, disposed radially intermediate side wall 169 and an inner cylindrical wall 172 which defines area of increased diameter 140. An induction coil 174 is insulatingly received within recess 170 and has its terminating leads 176 extending radially through side wall 169 through a passageway 178. Recess 170 and bore 178 are potted or filled with otherwise suitable material to provide sealing and shock resistance to assembly 30.

Conduit 32 is formed of rigid material suitable to ground tether assembly 30 to radiator 14 (refer FIG. 1) via appropriate fittings 180 and 182. Conduit 32 is illustrated as having two passageways 184 and 186 for protective routing of leads 176 from coil 174 and leads 188 from magnetic pickup 166, respectively, to the host vehicle body for subsequent connection (not shown) with a control circuit. Fittings 180 and 182 are illustrated as being integrally formed with conduit 32, fitting 182 being press-fit over magnetic pickup 166 to form an attachment point with tether assembly 30. Other approaches to tethering assembly 30, such as described in U.S. Pat. Nos. 4,246,995 and 4,362,226 could be satisfactorily substituted for the approach described hereinabove.

Referring to FIG. 5, armature 152 is dimensioned to permit limited freedom of axial movement within cavity 146. The left-handmost extent of inner cylinder wall 172 defines an annular surface 190 which coacts with a corresponding annular surface portion 194 of plate portion 154 of armature 152 through an interposed annular piece of specially selected pyrolitic friction material 192 of the type described in published European Patent Application Nos. 0 027 598 and 0 037 104, the specifications of which are hereby incorporated by reference. Annular surface 190 of inner cylinder wall 172 constitutes a grounded thrust surface or reaction member. Armature 152 and shaft 132 thus are radially retained by assembly 30 via bearings 133 and 135 but retain complete rotational freedom with respect thereto about the axis of shaft 132 as well as a limited freedom of axial movement between a first position (illustrated) wherein surface portion 194 of armature 152 physically contacts friction material 192 and alternatively, a second position in which armature 152 and shaft 132 are displaced leftwardly until the left-handmost surface of armature 152 approaches the right-handmost surface of cover 148. In either condition, teeth 164 remain in alignment with pickup 166. Assembly 30 thus constitutes a friction brake wherein housing 122 and armature 152 are constructed of ferrous material. When an electrical current is applied to leads 176, a magnetic circuit will be established, tending to draw armature 152 and shaft 132 rightwardly into frictional engagement with material 192 to brake the rotation of armature 152 with respect to housing 122.

Pyrolytic friction material 192 is specified for use in the interface between armature 152 and housing 122 because of its unique stick-slip performance characteristics and resistance to wear, particularly at elevated temperatures. Brake assembly 30 operates in a continuous slip mode whenever current is flowing in coil 174. Friction materials exhibiting substantially constant or increasing (with temperature and load) coefficient of friction have been found to yield superior performance and longevity in such applications. This may be due to carbon's inherently predictable friction performance characteristics, low wear rate, and minimal rate of change of dynamic coefficient of friction as well as low dynamic to static change in coefficient.

Experimentation carried out by the applicant employed 28 mil, single layer woven pyrolytic carbon friction material as described in European Patent Application No. 0 037 104. The material was employed dry and was a loose insert between housing 122 and armature 152. It is contemplated that the material could be successfully employed in a wet environment. The material could be bonded to armature 152, cylinder wall 172 or both with a second layer added for carbon to carbon frictional interface.

Figure 2:
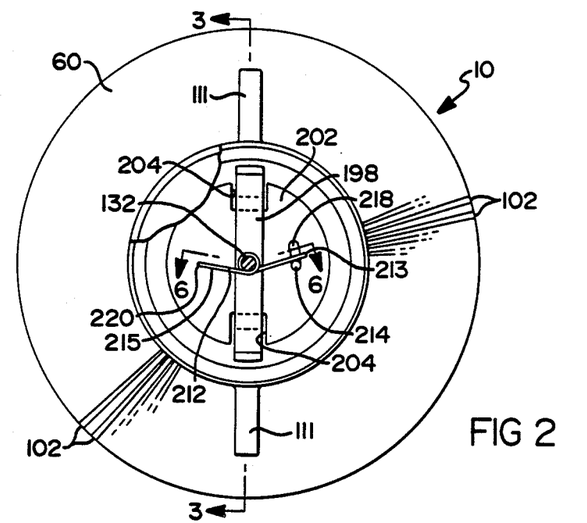
FIG. 2, is a front plan view of the clutch of FIG. 1 on an expanded scale with a portion of the front housing broken away to expose interior details of the fluid storage chamber.
Figure 6:
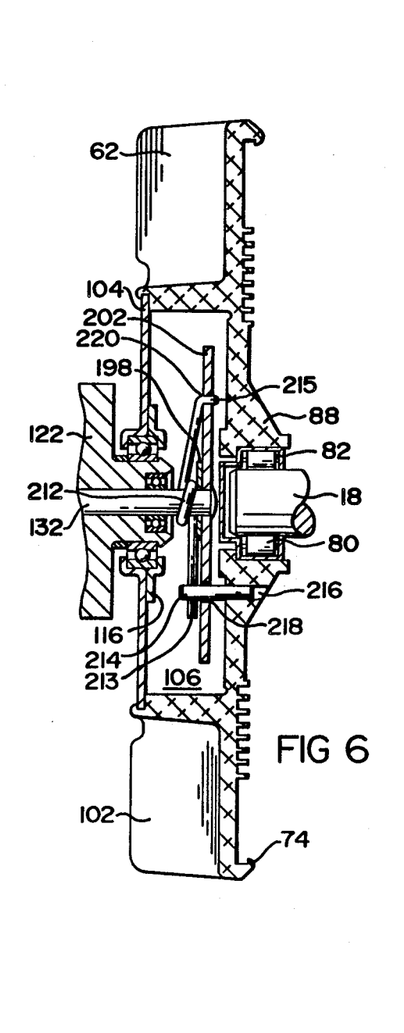
FIG. 6, is a broken sectional view taken on lines 6—6 of FIG. 2 on an expanded scale.

Referring to FIGS. 2, 3, and 6, shaft 132 extends rightwardly from reduced diameter portion 126 of housing 122 within fluid storage chamber 106. An elongated valving element assembly generally designated 196 is disposed within fluid storage chamber 106 and includes an elongated valve blade 198 which is supported by the right-hand end of shaft 132. The ends of blade 198 terminate in serpentine fashion with the end-most portions overlaying relatively large diametrically opposed drain ports 200 which are formed within cover member 62 near the radially outwardmost extend of fluid storage chamber 106 to provide fluid communication between operating chamber 100 and fluid storage chamber 106. The serpentine nature of valve blade 198 causes its ends to self bias themselves against the surface of cover member 62 immediately surrounding drain ports 200. Accordingly, as illustrated in FIG. 3, valve blade 198 is pressing right-wardly against the left-handmost surface of cover member 62 within fluid storage chamber 106 to effectively restrict or seal the passageway between chambers 106 and 100 established by ports 200. The right-handmost end of shaft 132 also supports a circular plate 202 which is of slightly smaller dimension than fluid storage changer 106 and which includes two diametrically spaced radially inwardly directed slots 204 which are of a dimension slightly wider than the width of valve blade 198 and are aligned therewith. The right-handmost end of shaft 132 has a flat 206 formed therein which passes through similarly shaped registering apertures 208 and 210 in valve blade 198 and plate 202, respectively, and are retained upon shaft 132 for displacement therewith such as by swedging of material forming the right-handmost extent of shaft 132. Shaft 132 also passes through a coil spring 212 for retention in an illustrated position. However, spring 212 is dimensioned so as not to interfere with the above described axial displacement of valving element assembly. Thus, definitionally, valving element assembly 196 comprises shaft 132, armature 152, valve blade 198, plate 202 and spring 212. Tether/friction motor assembly 30 comprises an actuator including housing 122, coil 174, cover 148 and conduit 32, which are substantially grounded to the host vehicle body via radiator 14.

Plate 202 and blade 198 are permitted a small degree (5°-30°) of rotational freedom with respect to cover assembly 60. This is accomplished by an anchor pin 214 which is press-fit within an aperture 216 within hub 88 of cover member 62 which projects into fluid storage chamber 106 and through a plane defined by plate 202. Pin 214 passes loosely through a crescent aperture 218 within plate 202. Blade 198 and plate 202 are therefore permitted freedom of rotation with respect to cover assembly 60 only to the extent of the major dimension of aperture 218. In FIG. 2, plate 202 and blade 198 are illustrated in their first or counterclockwise limit of travel. If plate 202 and blade 198 were rotated clockwise until pin 214 abutted the uppermost end of aperture 218 plate 202 and blade 198 would be in their second or clockwise limit of travel.

Coil spring 212 carried by armature 132 has one radially extending end 213 abutting pin 214 and another radially extending end 215 passing through an aperture 220 within plate 202 to urge blade 19 and plate 202 into the second limit of travel (not illustrated). It is contemplated that spring 112 could easily be reversed to tend to bias valve 198 and plate 202 in the clockwise (closed) position. Such reversal would keep clutch 10 disengaged whenever no signal was received by coil 174.

In operation, leads 176 are energized via an electronic control circuit to establish a magnetic field about coil 174. When full current is flowing through leads 176, valving element 198 will assume the position illustrated in FIG. 2. When no current is flowing, valving element 198 will be rotated clockwise from the illustrated position by spring 212 and, simultaneously, the springlike serpentine construction of valve blade 198 will tend to bias valving element assembly 196 radially leftwardly to frictionally disengage armature 152 from friction material 192. It is contemplated that the friction material could be carried by armature 152 and thus engage annular surface 190 of inner cylinder wall 172 with the same effect. In operation, both cover assembly 60 and clutch member 42 of clutch 10 are separately rotating relative to tether assembly 30. With coil 174 deenergized, valve blade 198 will tend to axially displace armature 152 into frictional disengagement with housing 122, thereby permitting spring 212 to rotate valve blade 198 and plate 202 from its illustrated position.

Figure 7:
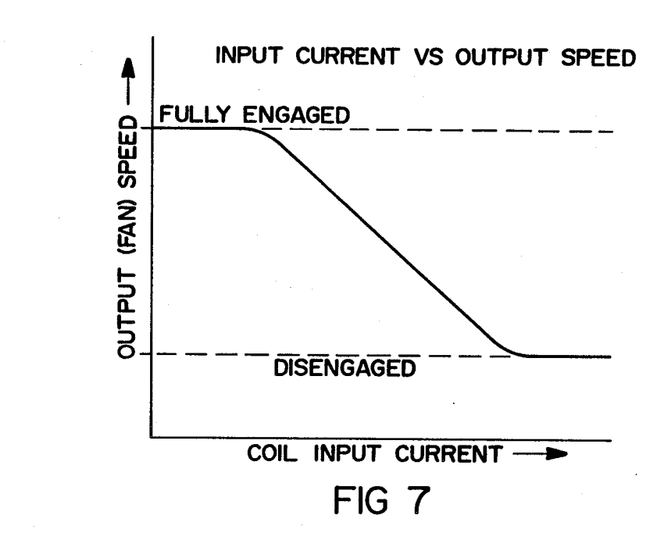
FIG. 7, is a graphical representation of the electromagnet input current versus fan speed characteristic of the preferred embodiment of the invention.

When coil 174 is electrically energized, the concentration of flux in the gap between surface 190 and armature 152 will draw valving element assembly 196 to the right frictionally engaging armature 152 with friction material 192. Because clutch 10, including valving element assembly 196 is being driven at or near the engine speed of the host vehicle, it will exhibit a continuous slip but will cause valve blade 198 to rotate counterclockwise with respect to cover assembly 60 an amount determined by the coil energization signal. As will be described in detail hereinbelow, the overall operating characteristic of the fan clutch is presented graphically in FIG. 7 whereby the amount of slip within clutch 10 and thus rotating speed of fan blades 34 are directly related to the amount of current flowing within inductor coil 174. When coil 174 is fully energized, ports 200 will be closed and viscous fluid will tend to accumulate within fluid storage chamber 106. Upon de-energization of coil 174, valve blade 198 rotates, tending to establish fluid communication between the fluid storage chamber 106 and operating chamber 100.

When current flow in coil 174 is reduced, the friction drag is likewise reduced and spring 212 tends to move blade 198 back toward the open position thereby modulating flow of fluid and the fan speed characteristic of the clutch 10.

In operation, the pumping action caused by the sweeping of the radially outward most portion of clutch member 42 by annular recess 94 causes a localized region of increased pressure within the operating chamber 100. This pumping arrangement is well known in the art and is described in U.S. Pat. No. 3,809,197, the specification of which is incorporated herein by reference. The increased pressure causes the viscous fluid in the operating chamber 100 to pass through holes 96 and into return passage aperture 110. The fluid will then pump radially inwardly through return passage 110 and into fluid storage chamber 106. If coil 174 is fully energized and apertures 200 are closed, within a relatively short time virtually all of the fluid will be pumped into return passage 110 and fluid storage chamber 106 causing clutch member 42 and shaft 18 to rotatably slip with respect to cover assembly 60 and fan blade 34. Thus, when the engine is cold, the blades will turn relatively slowly. With the blades relatively slowly, the engine temperature, lacking the supplementary cooling action of the fan, will increase toward operating temperature more rapidly than otherwise would be the case.

As will be described in detail below, electrical current within conductors 176 will be varied to continuously reposition valving element 198 to efficiently control the operating speed of fan blade 34 at an optimum speed. Whenever the valving element 198 is displaced from its position illustrated in FIG. 2, fluid stored in storage chamber 106 will flow through aperture 200 into operating chamber 100 thereby causing the clutch to engage and increasing the relative rate at which the fan 34 is turning. As fluid works itself radially outwardly through operating chamber 100, it is, in turn, pumped through holes 96 and radially inwardly through passage apertures 110 back to fluid storage chamber 106 as described herein above.

Figure 8:
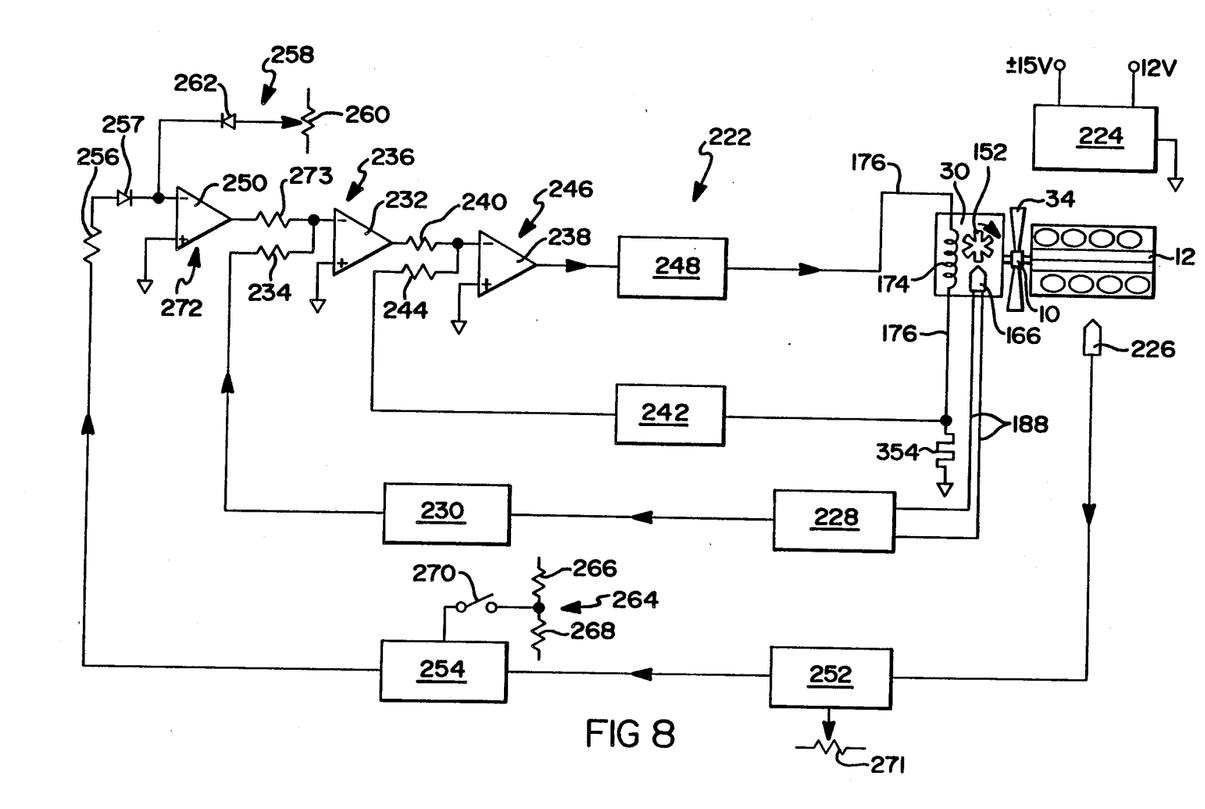
FIG. 8, is a block diagram of the control circuit of the preferred embodiment of the invention.

Turning now to the control system accompanying clutch 10, FIG. 8 illustrates, in block diagram form, a circuit 222 for controlling the operation of clutch 10.

Control circuit 222 is energized by a power supply 224 and receives its inputs from a linear temperature sender 226, magnetic pick-up 166 and several set point control circuits internal to circuit 222.

Temperature sender 226 is of the type manufactured by Sundstrand, model 555-8-00002 and is located either in the water jacket of IC engine 12, radiator 14 or other suitable location in the host engine cooling system. Magnetic pick-up 166 is preferably of the permanent magnet type located on the plane of rotation of armature 152.

Temperature sensor 226 and magnetic pick-up 166 provide host engine temperature and fan speed input signals to control circuit 222 which serves to control the operating speed of fan 34. Pick-up 166 is a two terminal device having both leads thereof providing a speed signal to an F/V converter 228 which, in turn, provides a voltage output signal representative of the fan speed to a fan speed loop stabilization circuit 230. Stabilization circuit 230 outputs a fan speed feedback signal to a negative input of an operational amplifier (OP AMP) 232 through a resistor 234. The output terminal of OP AMP 232 provides a speed error signal to the balance of control circuit 222. OP AMP 232 and its associated componentry thus serves as a closed loop fan speed regulator circuit 236. The speed error signal is fed to the negative input of another OP AMP 238.

One of the output leads 176 from coil 174 is connected to a current amplifier 242, the output of which is also interconnected to the negative input of OP AMP 238 through a resistor 244. The positive terminals of OP AMPs 232 and 238 are connected to ground. OP AMP 238 and its associated circuitry comprise a current regulator 246 which outputs a current error signal to a driver stage circuit 248. The output of driver stage circuit 248 supplies current to coil 174 via remaining lead 176.

Temperature sensor 226 outputs a temperature signal to the negative input of an OP AMP 250 through a series connected temperature sender amplifier circuit 252, temperature loop stabilization circuit 254, resistor 256 and diode 257. A minimum speed set circuit 258, including a potentiometer 260 and forward biased diode 262 is connected to the negative input of OP AMP 250. Furthermore, a range set circuit 264, including resistors 266 and 268 and a switch 270 are in circuit with stabilization circuit 254. A potentiometer 271 is in circuit with temperature sender amplifier circuit 252 to provide speed-temperature slope adjustments. OP AMP 250 and its associated componentry operate as a temperature regulator indicated generally at 272. The temperature error output of OP AMP 250 is interconnected to the negative input of OP AMP 232 through a resistor 273 to serve as a speed demand for the inner speed regulator loop.

With reference to FIGS. 3 and 6, a variable current signal flows through leads 176 which, in turn, frictionally engages housing 122 with armature 152 through friction material 192 to a greater or lesser degree to rotatively displace valve blade 198 with respect drain ports 200 to effect a proportional speed-current characteristic.

Magnetic pick-up 166 counts the passing teeth 164 of armature 152 and outputs a signal which is converted to an analog DC signal in F/V converter 228, creating a speed error signal at regulator OP AMP 232 the output which demands a current to set the inner loop fan speed. This speed is held constant within an allowable error determined by the loop gain, for changes in the engine input speed, supply voltage level, ambient temperature and the like.

The outer engine coolant temperature control loop then effects an optimized error signal which serves as a demand for the speed loop, insuring that the drive runs at an optimum output speed as a function of coolant temperature.

The resistance change of temperature sensor 226 is converted to a voltage and amplified in amplifier circuit 252 which is of the instrumentation type. Following stabilization circuit 254, a demand signal is created at the output of temperature regulator OP AMP 250 which has to exceed a minimum speed set point to provide the desired speed control. Thus, if sensed coolant temperature is below a set point temperature $T_1$, the fan speed will stay at a minimum value. Above $T_1$ up to a higher temperature $T_2$, fan speed will increase to a maximum value with increasing temperature. At steady state temperature between $T_1$ and $T_2$, fan speed will assume an intermediate rate.

Figure 9A:
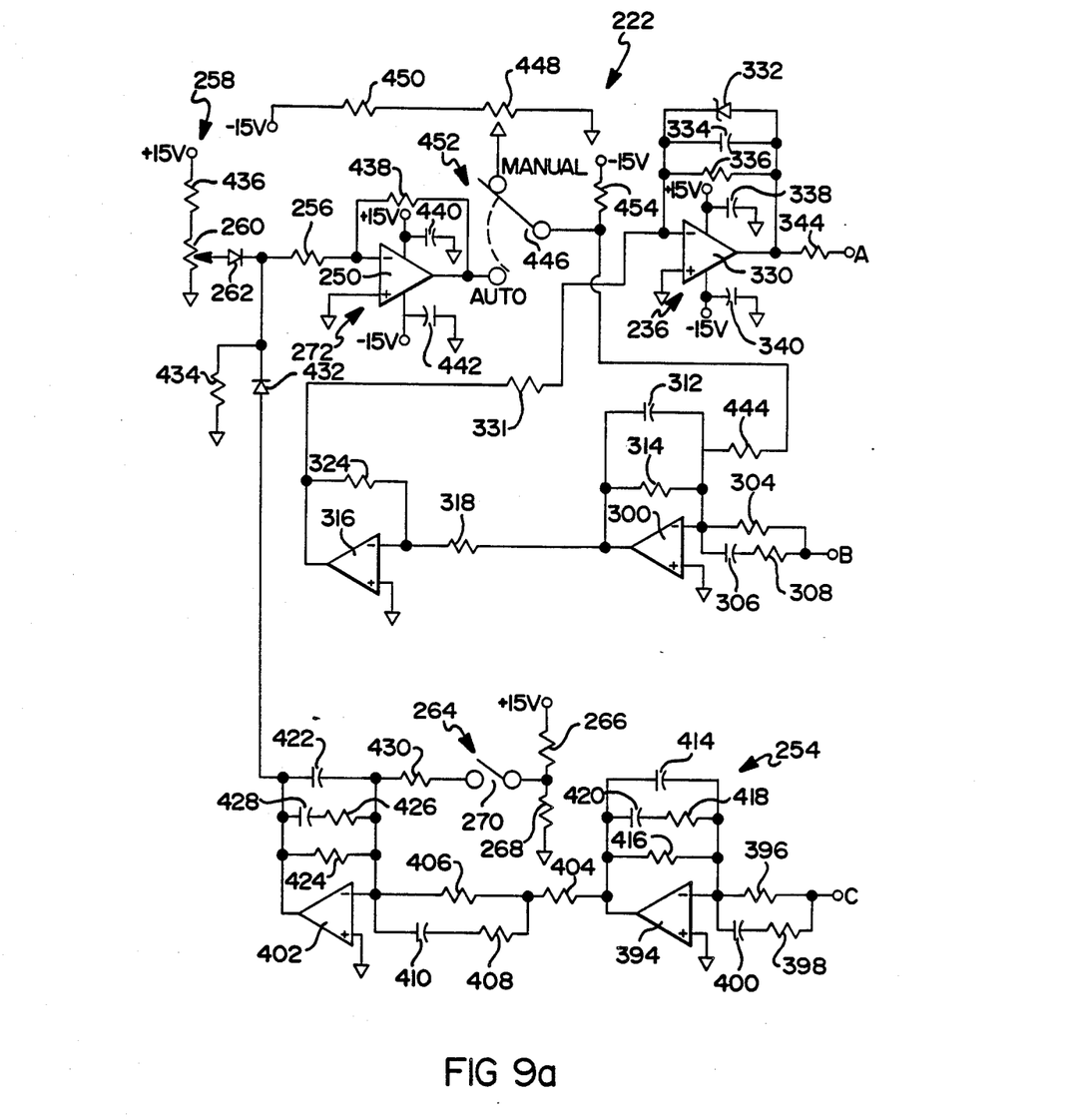
FIGS. 9a and 9b collectively represent a detailed schematic diagram of the control circuit of FIG. 8.
Figure 9B:
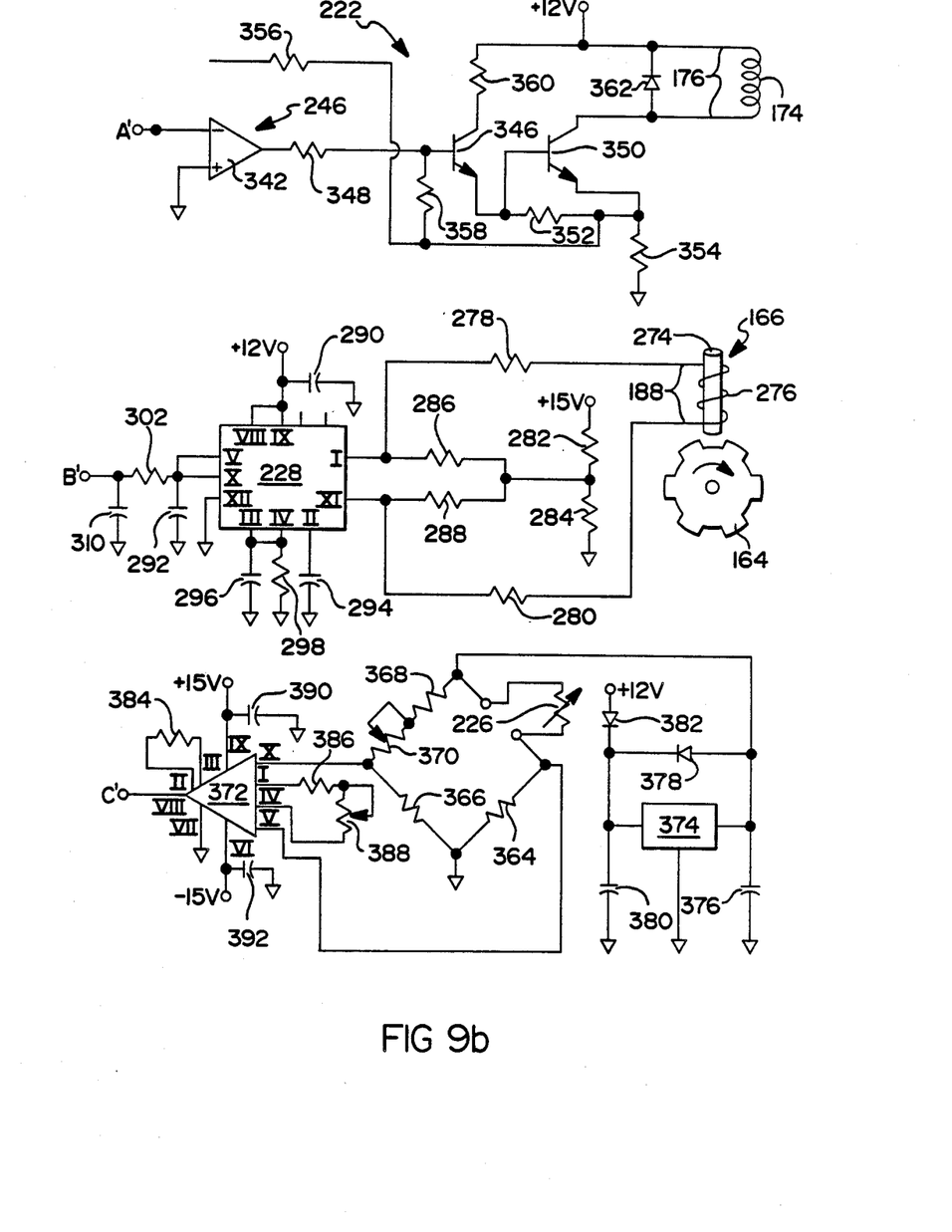
Figure 10:
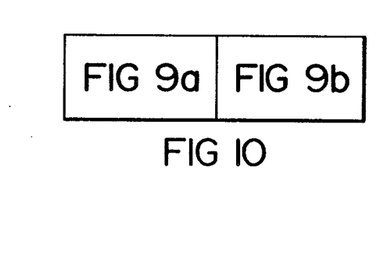
FIG. 10, is a pictorial representation of the suggested positioning of the drawing sheets containing FIGS. 9a and 9b to assist in a perusal of the present specification.

Referring to FIGS. 9a and 9b, which should be positioned as illustrated in FIG. 10, a schematic diagram of control circuit 222 is given. Terminals A, B and C of FIG. 9a should be viewed as directly connected with terminals A', B' and C', respectively, of FIG. 9b. The following detailed description relates to a particular circuit that the applicant's found to perform according to the presently claimed invention and the details thereof are not deemed to be limiting.

Figure 5A:
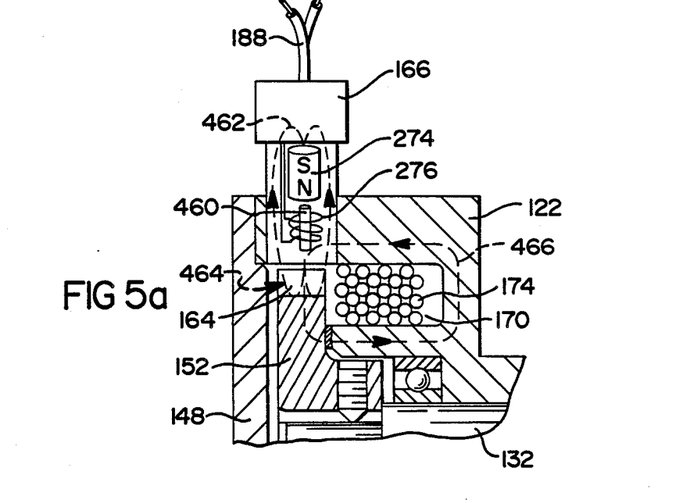
FIG. 5a, is a broken sectional view of a portion of the electromagnetic clutch assembly of FIG. 5.

Magnetic pick-up 166 includes a core magnet 274 concentrically disposed with a coil 276 electrically connected to inputs I and XI of F/V converter 228 which is of the type manufactured by National Semi-Conductor Model LM2907 through a pair of 100 ohm resistors 278 and 280. As can best be seen in FIG. 5a, magnetic pickup 166 includes a ferrous field shaping pin 460 disposed concentrically with magnet 274 and coil 276. Pin 460, magnet 274 and coil 276 are arranged and polarized to establish a magnetic field 462 having a predetermined sense or polarity within a sensing region designated generally at 464. Teeth 164 of armature 152 pass through region 464 in close proximity to magnetic pickup 166. Likewise, induction coil 174 creates a magnetic field 466 passing through housing 122 and sensing region 464. Magnetic fields 462 and 466 are superimposed upon one another within sensing region 464 and tend to be additive therein. This arrangement is believed to maximize reluctance change as teeth 164 pass through region 464, resulting in a permissible speed feedback signal while minimizing the risk of magnetic saturation of the ferrous material of sensor 166.

Returning to FIGS. 9a and 9b, converter 228 is referenced from the point of common connection between two 4.7K ohm resistors 282 and 284 tied between the +15 V power supply and ground. The point of common connection between resistors 282 and 284 is separately interconnected to input terminals I and XI for F/V converter 282 through separate 330 ohm resistors 286 and 288. Terminals VIII and IX of F/V converter 228 are directly connected to the +15 V power supply and interconnected to ground through a 15 microfarad tantalum capacitor 290. Terminals V and X of F/V converter 228 are interconnected to ground through a filter capacitor 292. Terminal XII is directly connected to ground and terminal II is interconnected to ground through a 0.01 microfarad capacitor 294. Terminals III and IV are interconnected to ground through a parallel combination of a 1.0 microfarad capacitor 296 and a 51.1K ohm resistor 298.

The signal output terminal of F/V converter 228 is interconnected with a − input of an OP AMP 300 of the type manufactured by Texas Instrument model TL074 through a 30K ohm resistor 302 series connected with a parallel combination of a 1M ohm resistor 304 and a series connected capacitor 306 and 150K ohm resistor 308. The point of common connection between resistors 302 and 308 is connected to ground through a 0.1 microfarad capacitor 310. Capacitor 310 and resistor 302 comprise a filter. The + input terminal of OP AMP 300 is connected to ground and the output terminal thereof is interconnected to its negative input terminal through a parallel combination of a 0.0068 microfarad capacitor 312 and a 3.3M ohm resistor 314. As will be described in detail herein below, OP AMP 300 functions as a summing junction and outputs a speed error signal.

The output of OP AMP 300 is interconnected with the negative input of a signal inverting OP AMP 316 through a 100K ohm resistor 318. The positive input of OP AMP 316 is connected to ground and the output is interconnected with the negative input through a 100K ohm resistor 324. OP AMP 316 and its associated componentry provides stabilization to the speed error signal which is fed directly from the output of OP AMP 316 to the negative input terminal of another OP AMP 330, having its positive input terminal connected to ground. The output terminal of OP AMP 330 is interconnected to the negative input terminal through resistor 331 to a parallel combination of a 5.1 volt clamping diode 332, a 0.047 microfarad capacitor 334 and a 10K ohm resistor 336. The +/−15 V power supply leads are connected to OP AMP 330 and to ground via separate 0.1 microfarad decoupling capacitors 338 and 340. OP AMP 330 and its associated componentry also serves to provide stabilization. OP AMPs 300, 316 and 330 in their associated components thus functionally correlate with stabilization circuit 230 and speed regulator circuit 236 of FIG. 8.

The output of OP AMP 330 is interconnected to the negative input of a OP AMP 342 through a 120K ohm resistor 344. The positive input terminal of OP AMP 342 is directly connected to ground and the output thereof is interconnected with the base of a type 2N4400 transistor 346 through a 3K ohm resistor 348. The emitter of transistor 346 is directly connected to the base of a type D 44H4 transistor 350 and interconnected to ground through a series combination of a 100 ohm resistor 352 and 0.15 ohm resistor 354. The negative input of OP AMP 342 is interconnected to the emitter of transistor 350 through a 10K ohm resistor 356. OP AMP 342 and its associated componentry correspond with current regulator circuit 246.

The base of transistor 346 is interconnected with the emitter of transistor 350 through a 510 ohm resistor 358. The collector of transistor 346 is interconnected to the +12 V power supply through a 60 ohm resistor 360.

The collector of transistor 350 is also interconnected to the +12 V power supply through induction coil 174 and a reverse free wheeling diode 362.

Temperature sender 226 constitutes one leg of a bridge circuit including a 350 ohm resistor 364 forming a second leg of the bridge, another 350 ohm resistor 366 forming a third leg of the bridge and series combination of a 301 ohm resistor 368 and the fixed resistance portion of a 100 ohm dc gain potentiometer 370 comprising a fourth leg of the bridge. The wiper of potentiometer 370 is connected to the point of common connection of potentiometer 370 and resistor 368. Resistor 364, 366 and 368 are 1% precision types. The corner of the bridge common to resistors 364 and 366 is connected to ground. The corner of the bridge common to resistor 364 and temperature sender 226 is connected to the negative input V of an amplifier 372 of the type manufactured by Burr Brown model INA101 instrument quality OP AMP. The point of common connection between resistor 368 and temperature sender 226 is connected to the output terminal of a type 7805 voltage regulator 374. The output of voltage regulator 374 is connected to ground through a 0.01 microfarad capacitor 376 and to the input terminal of regulator 374 through a reverse biased type IN4001 diode 378. The input of regulator 374 is also connected to ground through a 0.33 microfarad capacitor 380 and to the +12 V power supply 224 through a type IN4001 forward biased diode 382. The point of common connection between resistor 366 and potentiometer 370 is connected to the + input terminal X of amplifier 372. Terminals II and III of amplifier 372 are bridged by a 100K ohm resistor 384. Terminals I and IV of amplifier 372 are interconnected by a series combination of a 5K ohm resistor 386 and the fixed resistance portion of a 2K ohm slope gain potentiometer 388. The wiper of potentiometer 388 is electrically connected to the point of common connection of potentiometer 388 and resistor 386. Terminal VII of amplifier 372 is directly connected to ground and terminals IX and VI are connected to the +/−15 volt power supply, respectively and are each interconnected to ground through a separate 1.0 microfarad capacitor 390 and 392, respectively.

The above described bridge, regulator 374, amplifier 372 and their respective associated components correlate with the temperature sender amplifier circuit 252 of FIG. 8. Output terminal VIII of amplifier 372 is interconnected with the negative input terminal of an OP AMP 394 through a parallel combination of 100K ohm resistor 396 and a series connected resistor 398 and capacitor 400. The positive input of OP AMP 394 is connected to ground. The output terminal of OP AMP 394 is interconnected with the negative input of another OP AMP 402 through a parallel combination of a 100K ohm resistor 406 and series connected resistor 408 and capacitor 410. The output of OP AMP 394 is electrically interconnected with the negative input thereof through a parallel combination of a capacitor 414, a 100K ohm resistor 416, and a series combined resistor 418 and capacitor 420. Likewise, the output terminal of OP AMP 402 is interconnected with the negative input thereof through a parallel combination of a capacitor 422, a 240K ohm resistor 424, and a series combined resistor 426 and capacitor 428. The unspecified component values are selected to provide suitable temperature compensation for a particular implementation of the present invention and should be apparent to those of ordinary skill in the art in view of the present specification. The negative input of OP AMP 402 is also connected to range set circuit 264 through a 1M ohm resistor 430. Resistors 266 and 268 are 10K ohm and 1K ohm, respectively.

Range set circuit 264 is an option provided to permit two distinct temperature-speed characteristics.

The output OP AMP 402 is interconnected to the negative input of OP AMP 250 through a series combination of a forward biased type 1N4448 diode 432 and 5.1K ohm resistor 256. The point of common connection between diode 432 and resistor 256 is connected to ground through a 15K resistor ohm 434 and to the cathode of diode 262 of speed set circuit 258. The fixed resistance portion of potentiometer 260 of speed set circuit 258 is interconnected between ground and the +15 V power supply through a series 490 ohm resistor 436.

The positive input terminal of OP AMP 250 is connected to ground and the output thereof is interconnected with the negative input through a 10K ohm resistor 438. OP AMP 250 is connected to the +/−15 volt power supplies directly and separately connected to ground through 0.1 microfarad decoupling capacitors 440 and 442, respectively.

The output of OP AMP 250 is interconnected with the negative input of OP AMP 300 through a series combination of a 1M ohm resistor 444 and a manual-automatic mode switch 446. Switch 446 is of the single pole-double throw type having its manual terminal connected to the wiper of a 1K ohm potentiometer 448. The fixed resistance portion of potentiometer 448 is series connected with a 490 ohm resistor 450 between ground and the −15 V power supply. The common or output terminal of switch 446 is interconnected to the −15 V power supply through a biasing resistor 454. Switch 446, resistor 450 and potentiometer 448 comprise a manual speed control circuit indicated generally at 452.

Figure 8A:
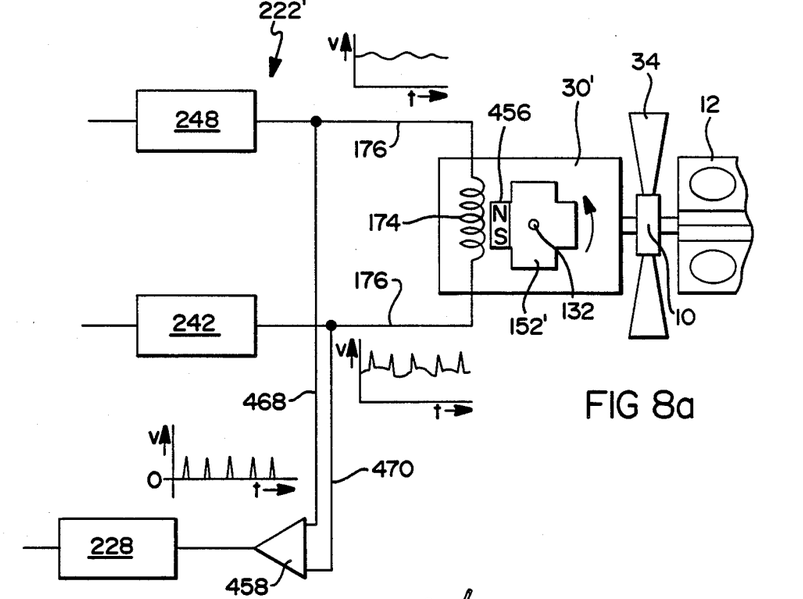
FIG. 8a, is a partial block diagram of an alternative embodiment of the control circuit of FIG. 8, indicating only the portions differing from the preferred embodiment.

Referring to FIG. 8a, an alternative embodiment of the invention is illustrated. Specifically, FIG. 8a should be viewed in conjunction with FIG. 8 as modifying a portion thereof whereby leads 188 from magnetic pickup 166 are eliminated and the fan speed information is fed back to circuit 222 via leads 176 which are also employed to carry the current output signal from driver stage circuit 248.

In the embodiment of FIG. 8a, magnetic pickup 166 is eliminated and replaced by one or more permanent magnets 456 carried by an armature 152' which is carried by armature shaft 132 in the same manner as described hereinabove. Magnet 456 passes in close proximity to induction coil 174 and induces therein periodic voltage spikes as a function of the speed of rotation of armature 152'. The output of driver stage circuit 248 and input of current amplifier 242 are interconnected to the inputs of a differential amplifier 458 via feedback lines 468 and 470, respectively. Differential amplifier 458 will then output a series of timing pulses into F/V converter 228. The balance of the modified control circuit 222' will operate as described hereinabove with respect to the schematic of FIG. 8. In the embodiment of FIG. 8, magnetic pickup 166 constitutes a sensor element and the teeth 164 of armature 152 constitutes flag means. In the alternative embodiment of FIG. 8a, magnet 456 constitutes flag means and induction coil 174 constitutes a sensor element.

In the broadest sense of the present invention, either the flag or sensor can be carried on or with one of the members while the other is carried on or with the actuator in rotational alignment with the first. For example, the flag could be a fan blade, portion of the output member, teeth or other member external to tether assembly 30. In rotational alignment is to be construed as meaning only that the flag must periodically pass close enough to the sensor to have its presence/absence detected. No other orientation is to be implied.

Furthermore, although described in application with a continuous slip friction brake, it is contemplated that the present invention could also incorporate an eddy current brake, a hysteresis brake, a D.C. generator or other suitable electromagnetic device that would supply the necessary mechanical or magnetic friction drag necessary to modulate valve element 198. Although tether assembly 30 is shown and described as a D.C. friction brake, it is further contemplated that an A.C. brake could be substituted in its place. It is also contemplated that a Hall effect switch could be employed in place of the inductor coil or permanent magnet as a sensor element.

It is to be understood that the invention has been described with reference to a specific embodiment which provides the features and advantages previously described, and that such specific embodiment is susceptible of modification as will be apparent to those skilled in the art. Accordingly, the foregoing is not to be construed in a limiting sense.

What is claimed is:

1. A viscous fluid clutch comprising:
   first and second members mounted for relative rotation about a common axis and defining cooperating shear surfaces;
   means operative to generate a flow of viscous fluid between said surfaces;
   valving means operable to effect modulation of said flow and including an element carried by one of said members displaceable between a first limit of travel for minimum torque transmission and a second limit of travel for maximum torque transmission;
   actuator means operative to selectively position said element between said limits of travel in response to an actuation signal, said actuator means including a substantially grounded thrust surface operative to frictionally engage said valving means to extract kinetic energy from said one of said members and input it to said valving means to move said valving means and thereby effect said modulation;
   means operative to sense the rotational speed of said one of said members and to generate a speed signal as a function thereof, said speed sensing means comprising flag and sensor elements disposed in relative rotational alignment, one of said elements carried by said actuator means and the other of said elements carried by said one of said members; and
   control means operative to generate said actuation signal as a function of said speed signal.

2. The viscous fluid clutch of claim 1, further comprising a conducting path interconnecting said control means and actuator means, said speed sensing means being further operative to superimpose said speed signal upon said activation signal for transmission to said control means via said conducting path.

3. The viscous fluid clutch of claim 1, wherein said control means is further operative to generate said actuation signal as a function of sensed temperature in a host system.

4. The viscous fluid clutch of claim 1, wherein said actuator means comprises a tethered electromagnet and housing carried by said second member concentrically about said axis, said electromagnet operative to establish a magnetic circuit which passes through ferrous material within said housing and valving means.

5. The viscous fluid clutch of claim 4, wherein said electromagnet comprises an inductor which is electrically energized as a function of both the temperature of a coolant associated with said clutch and the rotational speed of said second member.

6. The viscous fluid clutch of claim 5, wherein said speed sensing means is operative to sense differential current across said inductor and generate said speed signal as a function thereof.

7. The viscous fluid clutch of claim 4, wherein said sensing element comprises a variable reluctance sensor carried by said housing for detecting the presence or absence of said flag element within a sensing region within the flux path of said magnetic circuit.

8. The viscous fluid clutch of claim 7, wherein said variable reluctance sensor is operative to establish a magnetic field having characteristic flux intensity generally additive to said magnetic circuit flux path intensity within said sensing region.

9. The viscous fluid clutch of claim 8, wherein said control means, is operative to maintain said magnetic field below the saturation point of said housing.

10. The viscous fluid clutch of claim 1, wherein said flag element comprises a permanent magnet carried for rotation with said actuator means.

11. The viscous fluid clutch of claim 1, wherein said flag element comprises a ferrous member carried for rotation with said actuator means.

12. The viscous fluid clutch of claim 1, wherein said valving means is further operative to magnetically engage a substantially grounded member to effect said flow modulation.

13. A viscous fluid clutch comprising:
input and output members mounted for relative rotation about a common axis and defining cooperating shear surfaces;
means operative to generate a flow of viscous fluid between said surfaces;
valving means operable to modulate said fluid flow and including an element carried by said output member displaceable between a first limit of travel for minimum torque transmission and a second limit of travel for maximum torque transmission;
actuation means operative to selectively position said element between said limits of travel in response to an actuation signal, said actuation means including a substantially grounded thrust surface operative to frictionally engage said valving means to extract kinetic energy from said one member and input it to said valving means to move said valving means and thereby effect said modulation;
flag means disposed for rotation with one of said members;
a sensor disposed in rotational alignment with said flag means and operative to generate a speed signal as a function thereof; and
control means operative to generate said actuation signal as a function of said speed signal to effect operation of output member speed at a varying predetermined optimal rate.

14. The viscous fluid clutch of claim 13, further comprising a conducting path interconnecting said control means and actuator means, said speed sensing means being further operative to superimpose said speed signal upon said actuation signal for transmission to said control means via said conducting path.

15. The viscous fluid clutch of claim 13, wherein said control means is further operative to generate said actuation signal as a function of sensed temperature in a host system.

16. The viscous fluid clutch of claim 13, wherein said valving means further comprises means operative to angularly bias said valving element into one of said limits of travel.

17. The viscous fluid clutch of claim 13, wherein said valving means further comprises means operative to axially bias said valving means into a frictionally disengaged position.

18. A viscous fluid clutch comprising:
an input member mounted for rotation with a shaft;
an output member rotatably disposed on said shaft relative to said input member;
cooperating shear surfaces disposed on said input and output members and forming an operating chamber therebetween;
a fluid storage chamber adjacent said operating chamber;
a pump operative to displace fluid from said operating chamber to said storage chamber as a function of relative rotation between said members;
at least one drain port interconnecting said chambers for fluid communication therebetween;
valving means mounted coaxially with said output member for rotation therewith and axially displaceable to frictionally engage a substantially grounded thrust surface to extract kinetic energy from said output member and input it to said valving means to move said valving means and thereby effect modulation of the flow of fluid through said port by controlled angular displacement of a valving element between a first limit of travel for minimum torque transmission in which said element overlays said port and a second limit of travel for maximum torque transmission in which said port is relatively unobstructed;
flag means disposed for rotation with said second member;
a sensor disposed in rotational alignment with said flag means and operative to generate a speed signal as a function thereof;
actuator means defining said thrust surface and operative to selectively position said element between said limits of travel in response to an actuation signal; and
control means operative to generate said actuation signal as a function of said speed signal.

* * * * *